US011377629B2

United States Patent
Pintz (10) Patent No.: US 11,377,629 B2
(45) Date of Patent: Jul. 5, 2022

(54) ARRANGEMENT FOR MAKING HOMEMADE BEER PER SERVING AND A BREWER APPARATUS

(71) Applicant: Gyorgy Pintz, Budapest (HU)

(72) Inventor: Gyorgy Pintz, Budapest (HU)

( * ) Notice: Subject to any disclaimer, the term of this patent is extended or adjusted under 35 U.S.C. 154(b) by 171 days.

(21) Appl. No.: 16/667,735

(22) Filed: Oct. 29, 2019

(65) Prior Publication Data
US 2020/0216786 A1    Jul. 9, 2020

Related U.S. Application Data

(63) Continuation-in-part of application No. 16/240,667, filed on Jan. 4, 2019, now abandoned.

(51) Int. Cl.
C12C 13/10        (2006.01)
A47J 31/60        (2006.01)

(52) U.S. Cl.
CPC ............. *C12C 13/10* (2013.01); *A47J 31/605* (2013.01)

(58) Field of Classification Search
CPC .......... C12C 13/10; B67D 7/0266; B67C 3/06
See application file for complete search history.

(56) References Cited

U.S. PATENT DOCUMENTS

| 4,655,029 A * | 4/1987 | Weiss | B67C 7/0086 |
| | | | 53/403 |
| 4,911,212 A * | 3/1990 | Burton | B01F 35/422 |
| | | | 141/90 |
| 10,064,513 B2 | 9/2018 | Rehfuss | |
| 2004/0025701 A1* | 2/2004 | Colston | A47J 31/3628 |
| | | | 99/279 |
| 2007/0116801 A1* | 5/2007 | Kowalczyk | C12C 5/00 |
| | | | 426/16 |
| 2009/0196951 A1* | 8/2009 | Brandborg | C12G 3/06 |
| | | | 426/519 |
| 2010/0047386 A1* | 2/2010 | Tatera | C12C 11/003 |
| | | | 426/14 |

(Continued)

FOREIGN PATENT DOCUMENTS

| CA | 2976616 | 8/2016 | |
| DE | 19538023 A1 * | 4/1996 | ............... B67B 3/06 |

(Continued)

*Primary Examiner* — John J Norton
(74) *Attorney, Agent, or Firm* — Bayramoglu Law Offices LLC (57) ABSTRACT

The object of the invention is to provide an arrangement for brewing homemade beer per serving, which comprises an industrial stage of an industrial arrangement performing pre-fabrication and a domestic stage for home use performing fermentation-free brewing of beer along with preparation for consumption. The invention also describes a brewer apparatus (1) for use at home as well as the application method of the arrangement.
The brewer apparatus (1) is comprising at least one receiver unit (2) suitable for the addition and removal of a beer component container (5a, 5b), a liquid transfer unit (3) empties into the receiver unit (2), a filling member (4, 4b) is connected to the receiver unit (2), and a filling member (4, 4b) is connected to a gas transfer unit (8) suitable for delivering carbon dioxide into the end product container (9) or to a siphon (30). The filling member (4, 4b) prevents the overflowing of the beer foam at the bottling by overpressure.

12 Claims, 3 Drawing Sheets

(56) References Cited

U.S. PATENT DOCUMENTS

| | | | | |
|---|---|---|---|---|
| 2012/0251661 A1* | 10/2012 | Toombs | ............... | C12C 11/11 |
| | | | | 426/13 |
| 2014/0072678 A1* | 3/2014 | Jenkins | ............... | C12G 1/06 |
| | | | | 426/115 |
| 2014/0272019 A1* | 9/2014 | Schuh | ............... | A47J 31/407 |
| | | | | 426/115 |
| 2016/0251606 A1* | 9/2016 | Peirsman | ............ | B67D 1/0021 |
| | | | | 99/277 |
| 2016/0280527 A1* | 9/2016 | Griscik | ............ | B67D 1/0031 |
| 2016/0288064 A1* | 10/2016 | Tatera | ............ | G05D 11/005 |
| 2017/0022463 A1* | 1/2017 | Kamil | ............ | B65D 85/8043 |
| 2017/0240400 A1* | 8/2017 | Pellaud | ............ | B67D 1/0021 |
| 2018/0049582 A1* | 2/2018 | Rehfuss | ............ | B67D 1/0078 |
| 2018/0072972 A1* | 3/2018 | Shin | ............ | B67D 1/0888 |
| 2019/0106661 A1* | 4/2019 | Adam | ............ | B67D 1/0021 |

FOREIGN PATENT DOCUMENTS

| | | | | |
|---|---|---|---|---|
| DE | 102012010903 A1 * | 12/2013 | ............ | B67C 3/02 |
| EP | 3000778 | 6/2016 | | |
| MX | 2017003870 | 6/2017 | | |
| WO | 2014/086915 | 6/2014 | | |

* cited by examiner

ARRANGEMENT FOR MAKING HOMEMADE BEER PER SERVING AND A BREWER APPARATUS

SUMMARY OF THE INVENTION

The object of the present invention is to provide an arrangement for brewing homemade beer by the serving. The present invention comprises an industrial stage of an industrial arrangement performing pre-fabrication and a domestic stage for home use performing fermentation-free brewing of beer along with preparation for consumption. The invention also describes a brewer apparatus for use at home.

This invention is a continuation-in-part of the earlier application bearing the application Ser. No. 16/240,667, entitled "Arrangement for making homemade beer, brewer apparatus and method for application of the arrangement." The present application claims priority to that invention.

BACKGROUND OF THE INVENTION

The industrial process of brewing is well-known; the industrial process involves malting, mashing, lautering, boiling or often boiling with aroma hops and fermenting with yeast added, after which conditioning, filtering and packaging are performed. Many home-brewing machines are known. All of these have a feature in common in that they copy the industrial methods in a miniature form, implemented in one single device in particular cases. Occasionally, malted barley is embodied as a syrup, while hops are commonly embodied as an oil, but this does not accelerate the lengthy fermentation process, which can take several days. Boiling performed with bittering hops is a process that still requires about one hour, while aroma hops are typically boiled for approximately 5 minutes.

Known home equipment has the feature in common that yeast is used to make homemade beer, so the process consists of phases and is overall lengthy, while the required equipment is large and expensive. Further, only a larger amount of beer of one type may be produced at the same time.

The known publication document No. MX2017003870 describes a process where various liquids, optionally in a capsule form, are mixed with carbonated water. The invention describes the method for dispensing of these. An analogous solution is disclosed in document No. EP 3000778 A1 and US document No. 2018/0049582 A1. Document no. CA 2976616 is also used for mixing and dispensing beverages. US 2018/0072972 A1 discloses a mobile brewing apparatus. The primary purpose of the apparatus is to produce a fermented composition. Document no. WO 2014/086915 A1 is also known, which describes a process for producing beverages from capsule tea or coffee, and which is novel in that a receptacle is positioned on the wall of the device, as well as the addition of an injection means.

Patent script US 2014/0272019 describes a disposable beverage pod and apparatus for making a single serving drink with the mouth feel of wine, beer or whiskey drinks from alcohol-free artificial, synthetic compounds. It is believed that compounds present in conventionally brewed and fermented beverages may be responsible for spoilage, thereby limiting the shelf-life of the conventional beverages. So the concentrate is made artificially, not by conventional brewing. It is prepared from flavor groups compounds. With mixing about 12 flavor groups a beverage can be created which having the mouth-feel of a wide variety of wines, beers, liquors. The compounds are in a disposable pod with two chambers, one of them is the compound, one of them is the alcohol. The beverage is calorie-poor and long-lasting. It includes a pressurized gas canister and a cooling system. There is no detailed teaching about the apparatus, but it is not a brewer apparatus. It includes a mixing unit which mixes the water, the compounds and the alcohol. It is a rod blender. The rod blender or shaker extends to a mixer glass container which is tight to the mixing unit. The drinks can be poured from the container to the glasses.

There are several disadvantages to this example of the prior art, especially from our point of view. Beer consumers, particularly consumers of craft beers, are very sensitive to flavors and do not favor artificial flavors over traditional flavors. The real flavors of beer are caused by fermentation of yeast bacteria. The prior art presently discussed does not disclose yeast or fermentation; moreover, the disclosure does not indicate an industrial phase with real fermentation. There is no separate basic drink capsule and flavor capsule, so the customer cannot mix a tailor-made drink. The ingredients must necessarily be shaken to achieve a final product. However, for beer and other carbonated drinks, shaking will cause tension in the beverage that will result in excessive, unwanted foaming. The carbonic acid content is also very important in beer, so overfoaming damages the quality. Further still, this prior art does not disclose any means of bottling the drinks, or even limited bottling means that overcome some of these weaknesses.

Patent script US 2017/0022463 relates to a device and method for producing beer capsule filled with synthetic or natural beer granulate. The capsule contains two parts separated with a membrane. A part of the capsule contains the beer granulate and the other part the alcohol. The beer granulate is solved in warm water, the alcohol is driven out with $CO_2$ gas. There is no teaching about the apparatus, and especially about the gas saturation (warm water less absorbs the $CO_2$ gas), no teaching about the expected foaming of the beer, etc. The solution does not meet our goals.

Patent script US 2016/0222334 describes a fermentation monitoring devices for monitoring the fermentation of yoghurt, wine and beer. UV light is used during the fermentation, which is appropriate to control the fermentation process, especially for wines. The UV light is not used for cleaning bottles. The solution does not meet our goals.

An alternative solution that is more similar to the present invention is disclosed in US document No. 2016/0280527 A1. However, the main characteristic of this solution still includes fermentation, and the primary ingredient is yeast. Due to fermentation, this process also requires at least several days. This invention also produces only a larger amount, that is, it produces more than one identical portion at a time, while the equipment is fairly large and expensive and is not suitable for bottle packaging.

None of the prior art documents teaches how to make a compact, inexpensive home appliance that produces a bottle of beer, within 1-2 minutes, that can be customized by the consumer, and which is capable of sealing the beer bottle without overfoaming.

The object of the present invention is to overcome the shortcomings of these previous solutions and to elaborate on an invention in which a small, inexpensive device may be used at home, providing a way to easily produce beer within a few minutes, offering different contents and packaging designs for each bottle. Another object of the present invention is to avoid yeast utilization for the domestic stage and to avoid the need for several days of fermentation by the end user. A further object of the present invention is to provide the ability to produce a single serving portion—that is, a single bottle of beer—and to produce beers of different flavor and composition per bottle. A further object is to seal the bottle without overfoaming.

BRIEF DESCRIPTION OF THE INVENTION

The present invention is based on the discovery that if we proceed according to the independent claims, we may obtain a more favorable result than known in the art, particularly in regard to the long-felt need for quick, single-serving production of quality. It is the aim of the present invention to overcome the previous solutions, as well as the professional prejudice of brewers and consumers, by introducing this multi-stage brewing process. It is not the entire brewing process that's reproduced in a miniature form; rather, the present invention divides the process into two stages, where the complicated and lengthy stage is carried out under large-scale industrial conditions and only the most necessary final stage is carried out at home on a smaller scale. In this case, a basic preparation produced in a central location may be used, and at home this preparation is processed to completion with the addition of aromas according to needs and wishes as well as absorption of gas in the beverage. It is also within the scope of the invention to fill and seal the beer bottle under pressure without overflowing of the beer foam.

As part of the arrangement and method according to the present invention, it is desirable to use the industrial stage to carry out the activities with basic, natural ingredients such as barley, yeast, and bittering hops, so that for the domestic stage only fast aromatizing is to be performed. In the domestic stage, the industrial material no longer contains active yeast, so the carbonic acid desirable for beer is produced by a gas absorption process instead of post-fermentation.

The present invention may be more generally performed according to the independent claims. Alternative embodiments of the present invention are detailed in the dependent claims.

In general, the solution is an arrangement for making single servings of homemade beer, which comprises first an industrial stage of an industrial arrangement performing pre-fabrication, and second, a domestic stage for home use performing fermentation-free brewing of beer along with preparation for consumption. The arrangement of the domestic stage further comprises a liquid transfer unit, an end product container, a gas transfer unit, and at least one beer component container filled during the industrial stage. The beer component container is placed into a receiver unit or under a filling member, and is connected to the liquid transfer unit. A gas cartridge connects to the gas transfer unit. The feature of the invention is that the arrangement of the domestic stage comprises a brewer apparatus for even a single serving of beer, the brewing device having a filling member for preventing the overflowing of the beer foam from the end product container, and the gas transfer unit connecting to the filling member, which empties into the end product container or to a syphon.

It may be another feature that the beer component container can be a capsule; one beer component container has flavorings and the other beer component container has the concentrate of the fermented beer. This arrangement further comprises a sealing tool for sealing the end product container without overflowing of the beer foam.

The end product container may comprise a beer bottle which can be positioned on a horizontal and/or vertical sliding tray. The arrangement of the domestic stage comprises a water filter built for the brewer apparatus or inside the brewer apparatus. Certain embodiments may further comprise an ultraviolet light (UV) unit for disinfecting the end product container. Cooling units are arranged in the housing and/or it comprises one or more cooling compartments.

In general, the solution is also a brewer apparatus for making homemade beer per serving, comprising a housing and a liquid transfer unit. The invention further comprises a gas transfer unit, and at least one receiver unit suitable for the addition and removal of a beer component container. The liquid transfer unit empties into the receiver unit, and a filling member for preventing the overflowing of the beer foam from the end product container is connected to the receiver unit.

In some embodiments, the invention comprises another feature in the manner of a compressor suitable for creating a pressurized space. The compressor connects to the filling member, and the filling member contains a seal unit for sealing the end product container under overpressure. A syphon is inserted in the liquid transfer unit and the gas transfer unit joins into the syphon. A sealing tool is attached to the filling member for fastening locking elements onto the end product container. The filling member further comprises a dispenser unit suitable for delivering alcohol and/or salt composition.

At the method for the application of the arrangement, wherein at industrial stage a fermented beer concentrate or beer dry matter and an aroma preparation are manufactured, the beer concentrate or beer dry matter and/or the aroma preparation are enclosed in a beer component container, the beer concentrate or beer dry matter and the aroma preparation are used in a domestic stage without fermentation, where during this domestic stage the beer component container is placed in a brewer apparatus suitable for preparing one beer portion, along with letting a soluble liquid through this. It is characterized in that filling an end product container and preventing overflowing of the beer foam during the filling.

The method can be characterized by a pressurized space with overpressure of 0.1-2.5 bar, preferably 0.2-0.5 bar, which is created in the filling member; the end product container filled with the finished beer product is sealed under this overpressure. Water containing $CO_2$ gas is used as the solvent liquid. The beer concentrate or beer dry matter produced in the industrial stage is placed in a beer component container, and then the beer component container is placed in the receiver unit during the domestic stage. The aroma preparation uses dried and/or processed hops and/or hops oil and/or other aroma, and in given case filling material are poured into the beer component container. Alcohol and/or salt composition are added to the beer concentrate or into the beer component container in the industrial stage, or directly or indirectly to the end product container in the domestic stage. The liquid is combined with gas in a syphon, while optionally the syphon and/or the liquid transfer unit may be cooled.

Assorted Definitions

Beer per serving.—The term "beer per serving" refers to the amount typically consumed by one person, which fits in one or two bottles, pitchers or other containers, usually between 200 and 1200 ml.

Industrial stage—The brewing stage wherein the time-consuming first phase of primary fermentation is carried out typically in the presence of yeast, and where the pressure of the finished beer (beer concentrate) material is approximately atmospheric.

Domestic stage—The brewing stage wherein dilution, optionally aromatization and gas saturation of a prepared beer concentrate is carried out.

Liquid transfer unit—This is the piping and components between the water tank and the beer component container, including pumps.

Gas transfer unit—Piping and components to transfer CO2 and/or N2O gases.

End product container—One or two containers suitable for the storage and/or consumption of the finished serving, made of any material, typically between 200 and 1200 ml each.

Siphon—A liquid container capable of withstanding a pressure higher than atmospheric pressure.

Water filter—A device inside or attached to the water tank that helps ensure a water quality suitable for making beer. It is advisable to adapt the water filter to the typical quality of water supplied to the water tank. It may be a plain water softener, it may also be a microbiological filter, or it may be a multiphase water purifier based on the mechanism of reverse osmosis. The water filter may optionally include a water handling component suitable for salting the purified water to match a particular type of beer.

Overfoaming—Beer foam that overflows from the end product container, such as the beer bottle, gets out of the end product container and thus causes contamination. About 1-5 bar overpressure prevents the overfoaming, namely the overflowing of the beer foam during the filling.

DESCRIPTION OF THE FIGURES

The present invention will now be described in more detail based on figures and with references to the accompanying examples of embodiments. The attached figures are

DETAILED DESCRIPTION OF THE INVENTION

Figure 1:
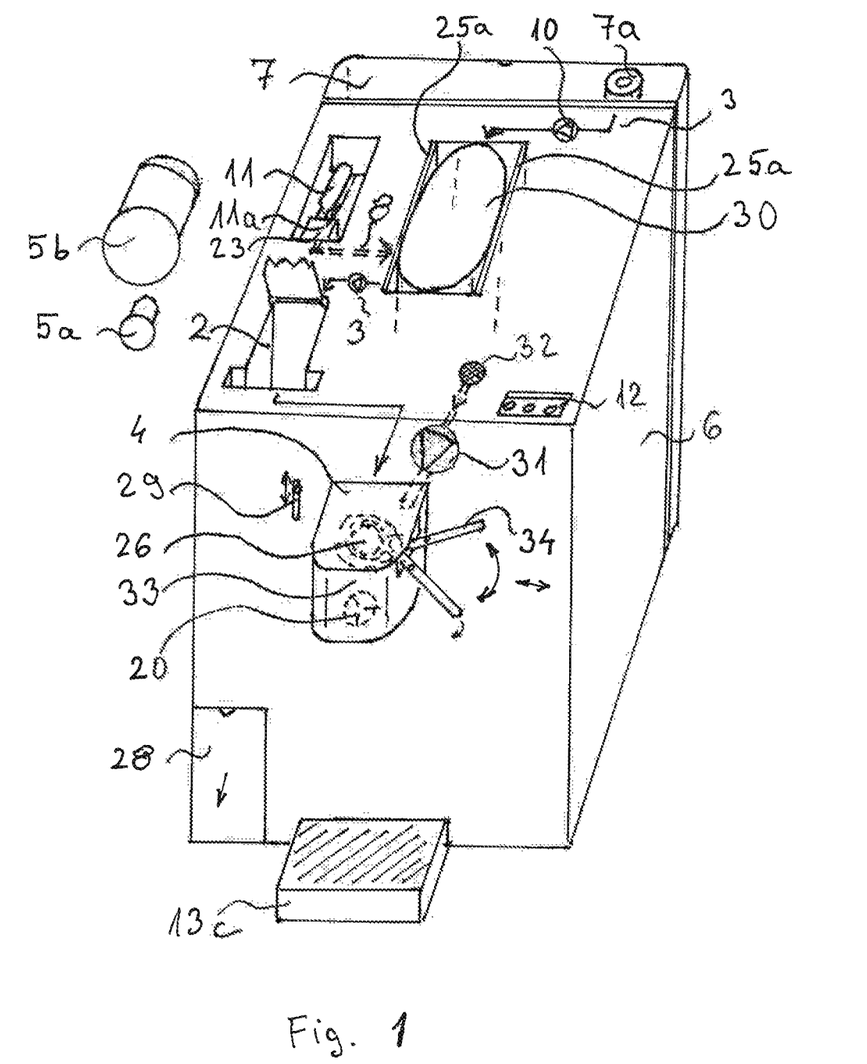
FIG. 1 represents a schematic drawing of the arrangement comprising the brewer apparatus with a syphon.

The beer concentrate 16 (shown in FIG. 4), and the beer component container 5*b* shown in FIG. 1 are manufactured under industrial conditions and are marketed for home users after manufacture. The required amount of beer concentrate 16 for a 500 ml bottle is preferably 200 ml; other concentrations may be desired for certain styles of beer. Production may take place in alcoholic or non-alcoholic form. In the case of an alcoholic variant, the alcohol that has been removed during the concentrating process may be replaced by the addition of more alcohol, adjusting the final alcoholic strength of the beer.

During the industrial process, cereal malate is treated and brewed in a known manner. If necessary, bittering hops are also added and brewing should then be performed for one additional hour. Cooling and yeast addition are performed next, followed by the main fermentation phase. After the main fermentation phase, the resulting material is dried. The concentration phase may be carried out in a known manner, for example, by using film evaporator equipment, a ceramic filtering procedure, and/or by lyophilisation. The concentrate and the dried product must no longer contain any active yeast. For example, 100-200 ml of concentrate is prepared and the concentrate is poured into a plastic bottle or tube or other suitable container. In the case of dry matter production, the dry matter is enclosed in a beer component container 5*b*, specifically in a capsule in this example. In the case of use of a larger beer component container 5*b*, or capsule, a stronger concentrate may also fit in the capsule. In another embodiment, the beer concentrate 16 or the beer dry matter (substance) and the aroma preparation 17 go into a common beer component container.

Beer raw material may comprise different materials ranging from malt or other grain types, also roasted, to common hops. The yeast type used may also be different types, so the resulting raw material may be based on a lager, a bottom-fermented type of beer, or an ale, a top-fermented type of beer. In the case of use of dry matter, the beer component container 5*b* is entirely filled with the raw material, or beer concentrate, the amount of which is preferably 25-200 mg to produce 500 ml of beer.

Figures 2, 3:
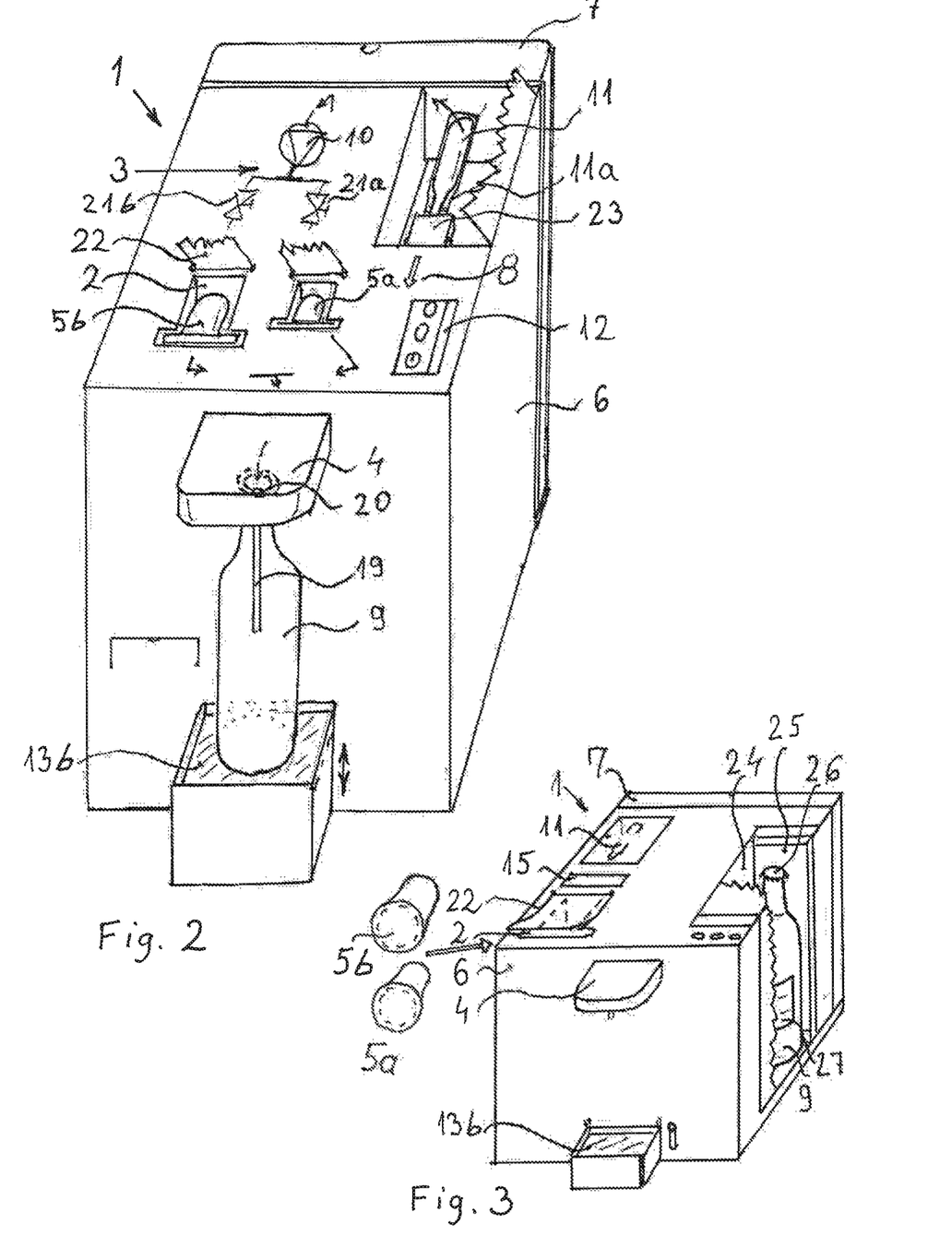
FIG. 2 represents a schematic drawing of another embodiment of the apparatus further comprising a shared filling member.
FIG. 3 represents a schematic drawing of an additional embodiment comprising a cooling compartment.

A further step of the industrial process, usable in certain alternate embodiments, is to prepare an aroma preparation 17 for the filling of a beer component container 5*a*, namely a capsule, as shown in FIGS. 1 and 2. In the case of the use of a pod or filter beer component container, it is marketed in packaging safeguarding the aroma, and dried aroma hops or hops pellets are preferably used for this. In another embodiment, a capsule is used as a beer component container 5*a*. Capsule filling is a known process in the prior art. This method is followed by placing hops granules or fluid aroma in the capsule to the extent of entirely filling the capsule. The beer component container 5*a* may also contain a salt composition in particular cases, especially when utilizing water filtered or distilled by reverse osmosis. At the same time, the salt composition characteristic of a particular type of beer may also be added to the liquid via the dispenser unit 15 or via the water filter 7*a*.

When using a smaller volume of an aroma preparation 17, for example, in the case of hops oil, a new method should be used because of the insignificant amount of oil. In this case, a filling material should be placed into the beer component container 5*a*, which material is not involved in the brewing process, but instead serves the function of filling the space, where such materials may be wood, food grade silica (e.g. aluminum silicate, sodium silicate) or other anti-caking minerals, or even plastic (e.g. HDPE, PP) granules. This is also required in order to avoid having the cover metal foil collapse upon puncturing the capsule, where this foil is used to seal the capsule. Roasted oak may preferably be used as wood material. The pre-treatment and application of wooden profile, wood chips, wood shavings or small wooden balls used as filling may also enable the addition of whiskey flavors, reminiscent of oak barrels, to the aroma.

FIG. 1 shows a typical embodiment—in a schematic manner, similar to other figures—only illustrating the connections between individual parts. A water filter 7*a* is also shown in the water tank 7. This may be a water softener device already known in the art for coffee makers, but may optionally contain activated carbon to achieve microbiological purity. The water filter 7*a* may be placed not only inside the water tank 7 but may instead be located next to it. The water filter 7*a* may be a reverse osmosis unit, even a multiphase unit. The water filter 7a may also comprise a component suitable for salting the purified water to match a particular type of beer.

The first portion of the liquid transfer unit 3 connects the water tank 7 with a syphon 30, and this section may also include a pump 10. The pump 10 may also function as a pump for a water filter 7a based on reverse osmosis. The syphon 30 is a water tank capable of withstanding a pressure greater than atmospheric pressure.

FIG. 1 also shows the beer component containers 5a, 5b, the receiver unit 2, the housing 6, the gas cartridge 11, the reversing profile 23 and the control unit 12.

The gas transfer unit 8 joins into the syphon 30. The liquid is saturated with carbon dioxide (or CO2) gas (or possibly nitrous oxide or N2O gas) inside the syphon 30. The syphon must withstand a pressure similar to domestic soda syphons due to overpressure of gas. The syphon 30 is connected to the receiver unit 2 via the second section of the liquid transfer unit 3. This section also contains the valve 21a shown in FIG. 1, but may also include a pump. However, instead of the use of a pump, the syphon 30 may also be operated by overpressure of the CO2 gas. In this case, drainage of the syphon 30 and the liquid transfer unit 3 must be provided, for example by means of a pump located in the first section of the liquid transfer unit 3 or by gravity.

Cooling units 25a may be installed around the syphon 30 and/or the liquid transfer unit 3. Any cooling unit 25a may be suitable but the use of cooling units 25a based on the Peltier effect is recommended. This has the advantage that cold water can absorb more CO2 gas.

FIG. 1 also shows a capsule container 28 suitable for removing used capsules operating in a manner similar to coffee makers.

During the filling process, the beer bottle constituting the end product container 9 is placed on the tray 13c, and the bottleneck is inserted into the filling member 4 via the seal unit 20. The insertion may be assisted by moving the filling member 4 up and down with the help of the lever 29.

The pressurized space 33 created by the compressor 31 on the filling member 4 is useful because it prevents the discharge of foam from the bottle during and after filling, thus the portion of beer can be sealed without resting it. As a compressor 31 an aquarium air pump will do that as well. At filling the pressurized space 33 has an overpressure of 0.1-2.5 bar, preferable 0.2-0.5 bar. The end product container 9 may be sealed by a sealing tool 34. The sealing tool 34 clamps the locking element 26 onto the opening of the end product container 9. The locking element 26 is generally a beer cap. The sealing tool 34 may be moved with arms or even electrically inside the filling member 4. When arms are used, the arms may be clamped tightly to complete the locking, and they may be bent down to the plane of the filling member 4 after use. The inlet throat 32 of the compressor 31 is also shown; however, this inlet throat 32 may also be located inside the housing 6. After sealing the end product container 9, overpressure can be eliminated in the filling member 4.

In another typical embodiment, the end product container 9 consists of two pieces, similar to the well-known twin-spout coffee makers. In another typical embodiment, the end product container 9 consists of a pitcher or glass from which the finished beer may be consumed directly. In this case, it is highly preferable to use an internal cooling unit 25a, however, the sealing tool 34 may be omitted.

FIG. 2 shows another embodiment of the brewer apparatus 1. The housing 6 and the water tank 7 are also shown. This embodiment comprises two receiver units 2. The receiver unit 2 is operated by the closure member 22. In the receiver units 2, the capsule shaped beer component containers 5a, 5b are also depicted. The first beer component container 5b contains beer dry matter, and the other beer component container 5a contains aroma hops preparation. On the front panel of the brewer apparatus 1, a descending U-shaped line symbolically indicates the possibility of emptying the used components from the beer component containers 5a, 5b. The liquid transfer unit 3 is illustrated in a symbolic way and small arrows indicate the direction of flow. Between the pump 10 and the receiver units 2, the valves 21a, 21b are depicted, which are preferably solenoid valves connected to the control unit 12. Under the cover that may be opened, the gas cartridge 11 is shown, the opening of which joins into a reversing profile 23. The reversing profile 23 assists the positioning of the gas cartridge 11 and includes the puncture needle. The gas cartridge 11 may be screwed into the reversing profile 23 by means of a gas cartridge holder element 11a known from soda syphons.

The clear, empty end product container 9 is located on the sliding tray 13b that slides in a vertical direction and which may be fixed in place. Finally, the mouth of the end product container 9 is pressed against the seal unit 20. The seal unit 20 is located in the filling member 4. From the filling member 4, the filling shaft 19 extends into the end product container 9. The liquid transfer unit 3 and the gas transfer unit 8 also join into the filling member 4 via the receiver units 2. The filling member 4 may comprise two separate filling shafts 19 for liquid and gas respectively, or the liquid transfer unit 3 and the gas transfer unit 8 may be joined together directly in front of the filling member 4 by means of a valve, preferably a solenoid valve. An embodiment may also be that the filling member 4 includes a UV unit 14. It may also be an embodiment that the end product container 9 is rotated along a perimeter of a circle for performing each function, such as filling, disinfection, gas dispensing. The filling member 4 may also be movable vertically and fixed in this position.

FIG. 3 is a schematic illustration of a further embodiment of the brewer apparatus 1. The housing 6, the water tank 7 and the receiver unit 2 with the closure member 22 are shown. The receiving unit 2 is configured so that the beer component containers 5a, 5b (shown beside the apparatus) are vertically positioned over one another. For example, the smaller beer component container 5a goes down, the larger beer component container 5b goes above the smaller one, a rim catches it. The sliding tray 13b is located under the filling member 4, and its actuating and locking mechanical switch is indicated next to it. The dispenser unit 15 is also shown, and the gas cartridge 11 is indicated symbolically. A properly insulated cooling compartment 24 is located on the right side of the brewer apparatus 1. The cooling compartment 24 has a pull-out or fold-out cover. There is a pull-out cooling unit 25 provided on each of the two sides of the cooling compartment 24. The end product container 9, on which a locking element 26 has already been mounted, is depicted in the cooling compartment 24 by a sub-section. A unique label 27 has also been applied on the end product container 9. The label 27 provides the opportunity to label your homemade beer for a friend, or to add a greeting or a caption characteristic of you. The cooling compartment 24 is suitable for cooling the prepared beer, allowing it to rest and allowing the ingredients to mature. Before use, the cooling unit 25 is to be cooled in a freezer. In a further embodiment, a cooling compartment 24 may be provided in which two end product containers 9 are completely surrounded by the cooling unit 25. The cooling unit 25 can also operate on the Peltier cooling principle.

The industrial stage of the arrangement has already been described. For example, to begin the domestic stage, the beer concentrate 16 or the beer dry matter in a capsule provided by the industrial stage—together referred to as the raw material—and preferably aroma preparation 17 containing also capsulated aroma hops are purchased. You may choose between several raw materials and a variety of aroma preparations, so each bottle of beer can be brewed in a different way. For example, when using 200 ml of beer concentrate 16, it is filled into a beer bottle at the beginning of the domestic stage, which bottle also serves as the end product container 9. Thick raw materials or beer dry matter may also be purchased in capsules. The aroma preparation 17 may include e.g. hops, hops granules, hops oil, hops pellets and other flavors, such as citrus, raspberry extract, for flavoring the beer.

The capsuled beer component container 5b is sat into the receiver unit 2. The brewer apparatus 1 may comprise one or two receiver units 2. In the case of a single receiver unit 2, the beer component container 5b containing the raw material is placed first. The closure member 22 positions the beer component container 5b and punctures it at both the front part and the larger front panel of it. By way of the liquid transfer unit 3, water, with a pressure of 1.5 to about 20 bar, preferably of 5 to 6 bar is to be poured via the beer component container 5b and via the filling head 4b or the filling member 4 into the end product container 9. Water dissolves and helps the raw material move into the beer bottle. Thus, a beer bottle of a capacity of 500 ml is to be filled to 200-300 ml. The empty capsule is then removed from the receiver unit 2. If the beer raw material does not contain alcohol or not enough alcohol, the missing alcohol may be provided for by pouring it into the bottle or via the dispenser unit 15. The aromatization of the dissolved raw material is done next. When there is only one receiver unit 2, the container with the aroma preparation 17 is to be placed into this same unit, and when there are two receiver units 2, the container, as well as the beer component container 5a of the same or smaller size as the preceding container, is to be placed into the other unit. This is treated at a similar pressure and temperature as above. The end product container 9, in this case the 500 ml beer bottle, is then entirely filled with the aroma preparation 17 thus dissolved in water. Filling via the mouth of the end product container 9 may be done in an open or in a hermetically sealed state. In the latter case, the end product container 9 is to be pressed against the seal unit 20. The pressing movement upwards may be done by the use of the sliding tray 13b or the filling member 4.

For two receiver units 2, the valves 21a, 21b located in the liquid transfer unit 3 may be used to control the order and the quantities. All this may be performed automatically by means of the control unit 12.

Both for the empty and semi-full, as well as full states of the end product container 9, the inside of the end product container 9 may be irradiated with UV-C light. This may be accomplished through the mouth of the end product 9 by the use of the UV unit 14.

After this, it is possible to treat the beer with carbon dioxide, with the help of the gas cartridge 11 and the gas transfer unit 8. At this point the end product container 9 is already filled and preferable cooled, and 2-4 mg of the $CO_2$ gas is applied into it, preferably at a pressure of 8 bar, by means of the filling member 4 or the gas head 4a. When the filling member 4 is used, the end product container 9 is positioned in place, and if the gas head 4a is used, the end product container 9 is positioned without touching it by means of the sliding tray 13a.

The end product container 9 containing the finished beer product is sealed with a locking element 26 and it is to be stored in the refrigerator. If the brewer apparatus 1 comes with a cooling compartment 24, the finished product may also be stored there. Pre-cooled cooling units 25 are to be placed in the cooling compartment 24, or the cooling unit 25 can works on the Peltier cooling principle.

A label 27 may be added to finished beer bottles at the beginning or at the end of the process and thus these may be used as personal gifts.

Figure 4:
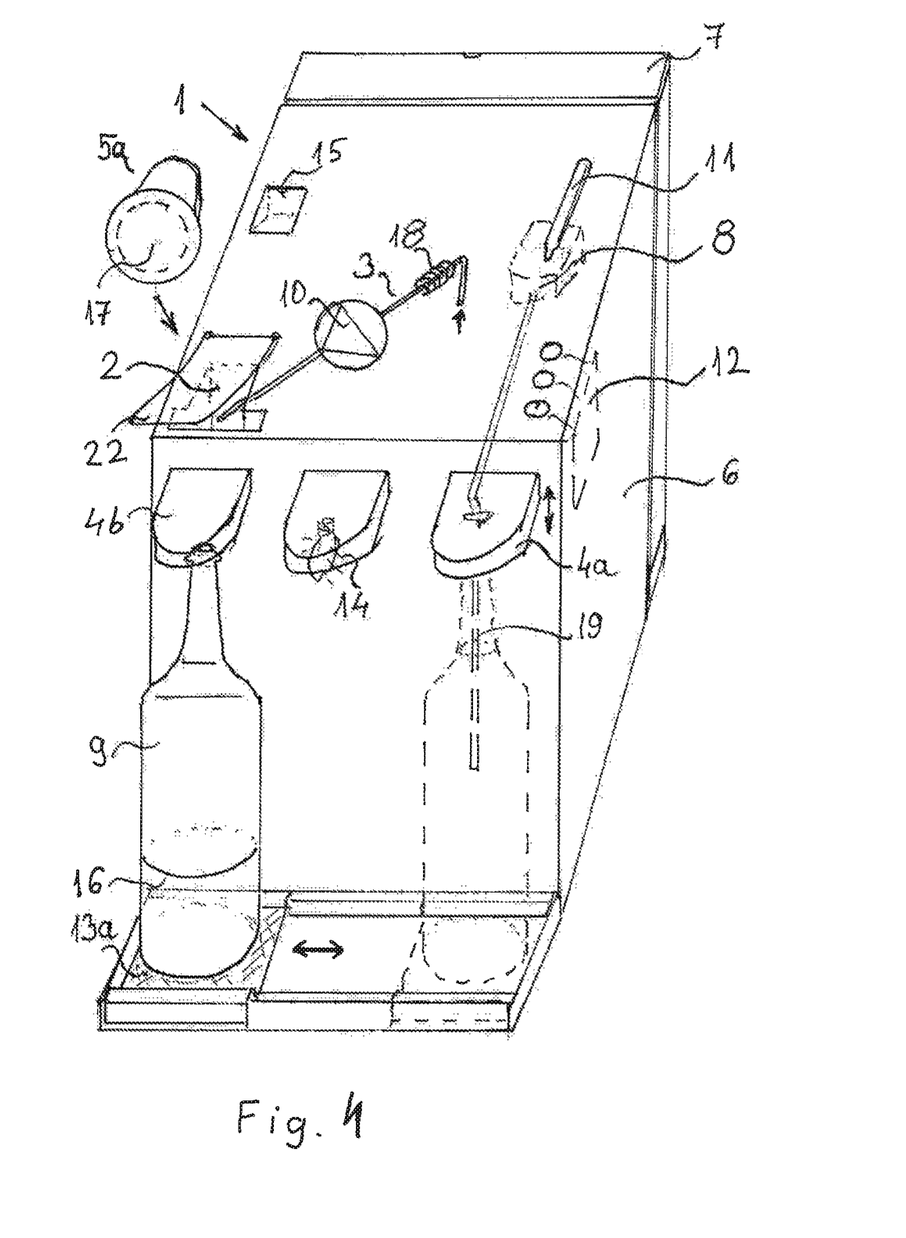
FIG. 4 represents a schematic drawing of an additional embodiment with separated filling members.

FIG. 4 shows a brewer apparatus 1 for even a single beer portion (preferable one dose), wherein the filling member 4 is formed by the gas head 4a and the filling head 4b. The beer component container 5a is shown before performing the positioning of it. The brewer apparatus 1 has a housing 6 and is built as one unit with the water tank 7 positioned behind it. The water tank 7 is connected and operates in a manner used for coffee makers, so in given case contains a water filter 7a. It is advisable to use soft, microbiologically clean water. At the top of the brewer apparatus 1, the receiver unit 2 is visible, which is enclosed by the closure member 22. The closure member 22 also positions and punctures the beer component container 5a, in a known manner, which container is a thin-walled aluminum capsule. Also located on the top of the brewer apparatus 1 is the dispenser unit 15 used primarily for adding alcohol. The dispenser unit 15 is connected directly either to the filling head 4b or to the liquid transfer unit 3. In the latter case, there is also the possibility of adding an alcoholic solvent to the aroma preparation 17 in the component container 5a during the brewing process. The filling head 4b is connected to the liquid transfer unit 3 via the receiver unit 2. The liquid transfer unit 3 has a pump 10 and a heating unit 18. The liquid transfer unit 3 is connected to the water tank 7, preferably to the bottom thereof. The pump 10 is capable of producing a pressure between 2 and 20 bar, for instance 5-6 bar. The electronic control unit 12 is located in the housing 6, which is suitable for starting, stopping, automatic controlling, descaling, filling the brewer apparatus 1, as well as for dispensing of gas, and is located next to switches. For example, the heater unit 18 can be used to disinfect the end product container 9 by hot water.

The end product container 9 is a beer bottle under the filling head 4b, and the filling head 4b joins into the mouth of the end product container 9 without a hermetic closure. In the end product container 9, the beer concentrate 16 may be seen already poured in. The end product container 9 is located on the sliding tray 13a. The sliding tray 13a allows the end product container 9 to be slid under the UV unit 14 and under the gas head 4a without having to touch it. The UV unit 14 includes an UV-C bulb that may be fit to the mouth of the end product container 9. Symbolically, dotted lines depict the position of the end product container 9 under the gas head 4a. In this position, the end product container 9 already contains the beer prior to filling up with gas. Gas filling, usually with $CO_2$ gas, is performed by the gas head 4a via the elastic filling shaft 19 extending under the beer surface. The gas head 4a is connected to the gas transfer unit 8. The gas cartridge 11 is connected to the gas transfer unit 8. For our example, the gas cartridge 11 contains 8 grams or 16 grams of $CO_2$. The gas transfer unit 8 includes a puncture needle, gaskets, and a gas valve known from soda syphons.

In a non-illustrated embodiment, the brewer apparatus 1 may comprise up to two gas cartridges 11, either or both being a CO2 cartridge or one of them being a CO2 and the other one being a N2O cartridge. The brewer apparatus 1 can be suitable preparing double, or more beer doses. Also in a non-illustrated embodiment, the aroma preparation 17 is a pod or filter bag placed in an aroma-preserving bag during the industrial stage, which bag may be placed in the brewer apparatus 1 by the known method utilized for coffee makers. The liquid transfer unit 3 then transfers the solvent to the receiver unit 2 at an overpressure below 1 bar.

The arrangement, apparatus and application method of the present invention are industrially applicable and offer many advantages. By the use of a small, inexpensive device one may easily brew beer at home in just a few minutes, optionally applying a different design to each bottle. The apparatus is not a reproduction of beer manufacturing in a miniature form, but only a means of aromatizing and gasifying, so the cost is similar to the cost of a coffee machine. At the domestic stage there is no need for the use of yeast and fermentation, so the process is extremely fast. You may vary the combination of beer raw material and aroma for each produced bottle. The homemade beer can also be given to friends as a personal gift. The apparatus can be automated. There is no need for separate cleaning apart from the wiping of the filling shaft, as any residual material leaves together with the capsule.

What is claimed is:

1. A system for making a single serving of homemade beer, said system comprising:
   a liquid transfer unit for providing a liquid;
   a first beverage component container comprising a first beverage component and a second beverage component container comprising a second beverage component, wherein the first beverage component comprises a beer concentrate and the second beverage component comprises a hops material, and wherein the beer concentrate comprises a grain material;
   a receiver unit connected with the liquid transfer unit to receive the liquid from the liquid transfer unit, the receiver unit being configured to receive the first beverage component container and the second beverage component container;
   a filling member connected with the receiver unit to receive the first beverage component, the second beverage component, and the liquid from the receiver unit;
   an end product container for engaging with the filling member to receive the liquid, first beverage component, and the second beverage component from the filling member;
   a gas transfer unit connected with the liquid transfer unit to provide a gas to saturate the liquid;
   a siphon connecting the gas transfer unit with the liquid transfer unit configured to receive and combine the gas from the gas transfer unit and the liquid from the liquid transfer unit to produce a gas saturated liquid; and
   a portable housing, wherein the liquid transfer unit, the gas transfer unit, and the siphon are inside the portable housing.

2. The system of claim 1, further comprising a sliding tray for receiving the end product container.

3. The system of claim 1, further comprising a UV unit for disinfecting the end product container.

4. The system of claim 1, further comprising a water filter for processing the liquid to a quality suitable for making beer.

5. The system of claim 1, further comprising a cooling unit for cooling the liquid received from the liquid transfer unit or the liquid received in the end product container.

6. The system of claim 1, further comprising a pump connected with the liquid transfer unit for pressurizing the liquid, the pressurized liquid having a pressure of 1.5 to 20 bar;
   wherein the pressurized liquid and the first beverage component are delivered into the end product container through the filling member.

7. The system of claim 1, further comprising a pump connected with the liquid transfer unit for pressurizing the liquid, the pressurized liquid having a pressure of 5 to 6 bar;
   wherein the pressurized liquid and the first beverage component are delivered into the end product container through the filling member.

8. The system of claim 1, wherein the first beverage component container and the second beverage component container are capsules.

9. The system of claim 1, wherein the liquid transfer unit connects the siphon with the receiver unit.

10. A system for making homemade beer per serving, said system comprising:
    a liquid transfer unit for providing a liquid;
    a first beverage component container comprising a first beverage component and a second beverage component container comprising a second beverage component;
    a receiver unit connected with the liquid transfer unit to receive the liquid from the liquid transfer unit, the receiver unit being configured to receive the first beverage component container and the second beverage component container;
    a filling member connected with the receiver unit to receive the liquid from the receiver unit;
    an end product container for engaging with the filling member to receive the liquid from the filling member;
    a sealing unit connected to the filling member for creating a seal between the filling member and the end product container;
    a filling shaft connected to the filling member for extending into the end product container and filling the end product container with the liquid from the filling member;
    a gas transfer unit connected with the end product container to provide a gas to saturate the liquid; and
    a portable housing, wherein the liquid transfer unit and the gas transfer unit are inside the portable housing,
    wherein the filling member is configured to create a pressurized space to prevent the discharge of foam from the end product container during and after filling.

11. The system of claim 10, further comprising a compressor connected with the filling member for creating a pressurized space in the filling member to prevent discharge of foam from the end product container during and after filling the end product container with the liquid, the pressurized space having an overpressure of 0.1 to 2.5 bar.

12. The system of claim 10, wherein a dispenser unit is connected with the filling member for delivering at least one of an alcohol composition or a salt composition to the liquid in the end product container.

* * * * *